United States Patent
Kosaka et al.

(10) Patent No.: US 10,202,667 B2
(45) Date of Patent: Feb. 12, 2019

(54) HIGH STRENGTH HOT ROLLED STEEL SHEET AND METHOD FOR MANUFACTURING THE SAME

(71) Applicant: JFE STEEL CORPORATION, Tokyo (JP)

(72) Inventors: Noriaki Kosaka, Fukuyama (JP); Satoshi Tsutsumi, Kawasaki (JP); Takayuki Murata, Kawasaki (JP); Motohiko Urabe, Kawasaki (JP)

(73) Assignee: JFE STEEL CORPORATION, Tokyo (JP)

( * ) Notice: Subject to any disclaimer, the term of this patent is extended or adjusted under 35 U.S.C. 154(b) by 370 days.

(21) Appl. No.: 14/899,958

(22) PCT Filed: Jun. 25, 2014

(86) PCT No.: PCT/JP2014/003407
§ 371 (c)(1),
(2) Date: Dec. 18, 2015

(87) PCT Pub. No.: WO2014/208089
PCT Pub. Date: Dec. 31, 2014

(65) Prior Publication Data
US 2016/0138126 A1 May 19, 2016

(30) Foreign Application Priority Data
Jun. 27, 2013 (JP) .................... 2013-134536

(51) Int. Cl.
| | | |
|---|---|---|
| C21D 9/46 | (2006.01) |
| C21D 8/02 | (2006.01) |
| C22C 38/00 | (2006.01) |
| C22C 38/14 | (2006.01) |
| C22C 38/60 | (2006.01) |
| C22C 38/02 | (2006.01) |
| C22C 38/04 | (2006.01) |
| C22C 38/06 | (2006.01) |
| C22C 38/12 | (2006.01) |
| B32B 15/01 | (2006.01) |
| C21D 1/60 | (2006.01) |
| C21D 6/00 | (2006.01) |
| C23C 2/02 | (2006.01) |
| C23C 2/06 | (2006.01) |

(52) U.S. Cl.
CPC .............. *C21D 9/46* (2013.01); *B32B 15/013* (2013.01); *C21D 1/60* (2013.01); *C21D 6/005* (2013.01); *C21D 6/008* (2013.01); *C21D 8/02* (2013.01); *C21D 8/0205* (2013.01); *C21D 8/0221* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C23C 2/02* (2013.01); *C23C 2/06* (2013.01); *C21D 2211/004* (2013.01); *C21D 2211/005* (2013.01)

(58) Field of Classification Search
None
See application file for complete search history.

(56) References Cited

U.S. PATENT DOCUMENTS

2002/0036035 A1  3/2002  Kashima et al.

FOREIGN PATENT DOCUMENTS

| | | | |
|---|---|---|---|
| CN | 1032556 A | 4/1989 | |
| CN | 1322256 A | 11/2001 | |
| EP | 0308751 A1 | 3/1989 | |
| EP | 1170390 A1 | 1/2002 | |
| EP | 2177640 A1 * | 4/2010 | ........... C12D 8/0426 |
| EP | 2554705 A1 | 2/2013 | |
| JP | H06-200351 A | 7/1994 | |
| JP | H07-197124 A | 8/1995 | |
| JP | 2002-086209 A | 3/2002 | |
| JP | 2002-105595 A | 4/2002 | |
| JP | 2002-322541 A | 11/2002 | |
| JP | 2003-112204 A | 4/2003 | |
| JP | 2003-321734 A | 11/2003 | |
| JP | 2006161112 A * | 6/2006 | |
| JP | 2010-053434 A | 3/2010 | |
| JP | 2010-126772 A | 6/2010 | |
| JP | 2011-202244 A | 10/2011 | |
| JP | 2011-225980 A | 11/2011 | |
| JP | 2012-167361 A | 9/2012 | |
| JP | 2013-023721 A | 2/2013 | |
| WO | 2013/011660 A1 | 1/2013 | |

OTHER PUBLICATIONS

Jul. 29, 2016 Office Action issued in Chinese Patent Application No. 201480035821.7.

(Continued)

*Primary Examiner* — Jenny R Wu
(74) *Attorney, Agent, or Firm* — Oliff PLC

(57) ABSTRACT

There is provided a high strength hot rolled steel sheet having a composition comprising C: 0.040% to 0.100%, by mass %, Si: 0.50% or less, by mass %, Mn: 1.00% to 2.00%, by mass %, P: 0.03% or less, by mass %, S: 0.006% or less, by mass %, Al: 0.08% or less, by mass %, N: 0.0080% or less, by mass %, Ti: 0.14% to 0.22%, by mass %, and Fe and incidental impurities, and a method for making the same. The high strength hot rolled steel sheet includes a microstructure in which a primary phase is a ferrite phase and fine carbides containing Ti are dispersion-precipitated.

15 Claims, No Drawings

(56) References Cited

OTHER PUBLICATIONS

Jun. 2, 2016 European Extended Search Report issued in European Patent Application No. 14 818 027.6.
Sep. 2, 2014 International Search Report issued in International Application No. PCT/JP2014/003407.

* cited by examiner

HIGH STRENGTH HOT ROLLED STEEL SHEET AND METHOD FOR MANUFACTURING THE SAME

TECHNICAL FIELD

This application relates to a high strength hot rolled steel sheet, which is a hot rolled steel sheet useful for the application to automotive members and the like, which has yield strength (YS) of 740 MPa or more over a range from the central portion to the end portion in the sheet width direction, and which exhibits predetermined strength across the sheet surface stably, and a method for manufacturing the same.

BACKGROUND

In recent years, from the viewpoint of global environmental conservation, enhancement of the automotive fuel economy has been aimed on an automobile industry-wide basis in order to reduce the amount of $CO_2$ output. Reduction of the weight of an automotive body by decreasing the thicknesses of constituent members (automotive part elements) is most effective in enhancement of the automotive fuel economy. Also, in order to ensure the safety of occupants in the event of a crash, it has been required to strengthen the automotive body and improve crash safety of the automobile body. From such viewpoints, high strength hot rolled steel sheets capable of ensuring the compatibility between the weight reduction and the safety have been used as automotive part elements and the usage thereof has increased year after year.

In the case where automotive parts are produced by using such high strength hot rolled steel sheets, some parts are produced by subjecting a coil-shaped high strength hot rolled steel sheet (hot rolled coil) to slitting in the longitudinal direction thereof to produce a hoop having a predetermined width and subjecting the resulting hoop to pressing to form into a predetermined shape. Here, if there are variations in the strength in the width direction of the hot rolled coil serving as the element for the part, various problems occur, for example, the strength required for part of hoops, among the slit hoops, is not reached, or cracking occurs in pressing of the hoop. Also, strength variations in the width direction of the hot rolled coil (sheet width direction) tend to increase as the strength of the steel sheet is enhanced.

Consequently, in particular, with respect to the high strength hot rolled steel sheet used in the state of being slit into the hoop, demands for steel sheets exhibiting excellent in-plane strength uniformity have been increased.

Various studies have been made on the technologies to enhance the strength of a steel sheet and enhance the in-plane strength uniformity previously.

As for the steel sheet production technology aiming at enhancing the strength, for example, Patent Literature 1 proposes a high strength hot rolled steel sheet, wherein the steel sheet composition is specified to be a composition containing, on a percent by mass basis, C: 0.07% or more and 0.13% or less, Si: 0.3% or less, Mn: 0.5% or more and 2.0% or less, P: 0.025% or less, S: 0.005% or less, N: 0.0060% or less, Al: 0.06% or less, Ti: 0.08% or more and 0.14% or less, and V: 0.15% or more and 0.30% or less in such a way that a formula (1) (Ti≥0.08+(N/14×48+S/32×48)) and a formula (2) (0.8≤(Ti/48+V/51)/(C/12)≤1.2) are satisfied and the steel sheet microstructure is specified to be a microstructure, which has a ferrite phase area ratio of 97% or more and in which Ti-V based fine carbides having an average particle diameter of less than 10 nm are dispersion-precipitated in the ferrite phase and the volume fraction of the fine carbides is 0.007 or more relative to the entire microstructure of the fine carbides.

Then, according to the technology proposed in Patent Literature 1, the high strength hot rolled steel sheet having a tensile strength of 980 MPa or more and exhibiting excellent workability is obtained by specifying the steel sheet microstructure to be substantially a ferrite single phase microstructure and dispersion-precipitating Ti-V based fine carbides having an average particle diameter of less than 10 nm in the ferrite phase. Also, according to the technology proposed in Patent Literature 1, the Ti-V based fine carbides can be precipitated stably by specifying the steel sheet microstructure to be a microstructure which satisfies the formula (1) (Ti≥0.08+(N/14×48+S/32×48)) and the formula (2) (0.8≤(Ti/48+V/51)/(C/12)≤1.2) described above and optimizing the coiling temperature in production of the hot rolled steel sheet and, thereby, the Ti-V based fine carbides are precipitated sufficiently even in an end portion in the hot rolled steel sheet width direction, where the amount of precipitation of carbides becomes insufficient easily, so that predetermined strength is obtained.

Likewise, as for the steel sheet production technology aiming at enhancing the strength, Patent Literature 2 proposes a high strength hot rolled steel sheet, wherein the steel sheet composition is specified to be a composition containing, on a percent by mass basis, c: 0.02% to 0.10%, Si≤2.0%, Mn: 0.5% to 2.0%, P≤0.08%, S≤0.006%, N≤0.005%, and Al: 0.01% to 0.1% and containing Ti in an amount satisfying Ti: 0.06% to 0.3% and 0.50<(Ti-3.43N-1.5S)/4C and the steel sheet microstructure is specified to be a microstructure which has an area ratio of low temperature transformed product and pearlite of 15% or less and in which TiC is dispersed in polygonal ferrite. Then, according to the technology proposed in Patent Literature 2, the high strength hot rolled steel sheet exhibiting excellent stretch flangeability and having tensile strength (TS) of 70 kgf/mm$^2$ (686 MPa) or more is obtained by specifying the composition and the microstructure, as described above.

On the other hand, as for the technology to improve the stability of mechanical properties of a steel sheet, for example, Patent Literature 3 proposes a technology to produce a high strength steel sheet by subjecting a steel slab having a composition containing, on a percent by mass basis, C: 0.05% to 0.15%, Si: 0.06% to 0.7%, Mn: 1.0% to 2.5%, P: 0.01% to 0.05%, S: 0.0050% or less, Al: 0.01% to 0.10%, N: 0.005% or less, Nb: 0.01% to 0.10%, and Ta: 0.001% to 0.010% and further containing at least one of V: 0.10% or less and Ti: 0.100% or less to hot rolling, cold rolling, annealing, and temper rolling under predetermined conditions. Then, according to the technology proposed in Patent Literature 3, a stable precipitate can be precipitated by adding Nb and Ta at the same time and a high strength steel sheet exhibiting excellent stability of mechanical properties is obtained by using the steel slab, to which Nb and Ta have been added at the same time, and controlling the cooling condition after finish rolling in the hot rolling, the coiling temperature, and the annealing condition.

Meanwhile, Patent Literature 4 proposes a hot rolled steel sheet which contains c: 0.1% or less, Mo: 0.05% to 0.6%, and Ti: 0.02% to 0.10% and in which carbides containing Ti and Mo within the range satisfying Ti/Mo≥0.1 on an atomic ratio basis are finely dispersed into a ferrite microstructure substantially. Then, according to the technology proposed in Patent Literature 4, the steel sheet in which mechanical property variations are reduced, the strength in the coil width direction is uniform, and excellent mechanical property uniformity is exhibited is obtained by strengthening the ferrite microstructure with the fine precipitate having the above-described Ti/Mo atomic ratio.

CITATION LIST

Patent Literature

PTL 1: Japanese Unexamined Patent Application Publication No. 2011-225980
PTL 2: Japanese Unexamined Patent Application Publication No. 6-200351
PTL 3: Japanese Unexamined Patent Application Publication No. 2011-202244
PTL 4: Japanese Unexamined Patent Application Publication No. 2002-322541

SUMMARY

Technical Problem

However, as for the technology proposed in Patent Literature 1, a high proportion of V which degrades the stability of carbides is contained and, in addition, the thermal stability of carbides is not considered. Consequently, in production of the hot rolled steel sheet, there are problems that after coiling, the carbides are coarsened in the central portion in the sheet width direction, where the cooling rate is small, the strength is reduced easily, and variations in the strength occur easily. Meanwhile, as for the stability of mechanical properties, Patent Literature 1 mentions that the end portion in the coil width direction comes into a supercooled state in the coiling step of the hot rolled steel sheet production and, thereby, fine carbides tend to be precipitated insufficiently in the end portion in the sheet width direction. However, in the technology proposed in Patent Literature 1, precipitation behavior of the carbides and coarsening are not considered sufficiently and, therefore, there is a problem that the susceptibility of the strength uniformity to the coiling temperature becomes high.

In the technology proposed in Patent Literature 2, as is shown by the example thereof, the Si content of a steel sheet having yield strength of 740 MPa (75.5 kgf/mm$^2$) or more is more than 0.5% and it is difficult for the steel sheet having such a high Si content to obtain good surface quality. Also, the technology proposed in Patent Literature 2 aims at enhancing strength of the steel sheet through precipitation strengthening by TiC, although the thermal stability and the precipitation behavior of the carbides are not considered. Consequently, it is difficult for the technology described in Patent Literature 2 to produce a hot rolled steel sheet exhibiting good strength uniformity.

As for the technology proposed in Patent Literature 3, the steel sheet exhibiting excellent strength uniformity in the coil longitudinal direction is obtained. However, no information on the strength uniformity in the sheet width direction is shown. In addition, in the technology proposed in Patent Literature 3 as well, the relationship between the precipitation behavior of the precipitates contributing to enhancement of strength of the steel sheet and coarsening are not considered, so that it is difficult to stabilize the strength of the end portion in the sheet width direction and the strength in the central portion. Meanwhile, a steel sheet having yield strength YS of 740 MPa or more is not obtained by the technology proposed in Patent Literature 3.

In the technology proposed in Patent Literature 4, enhancement of the strength of the hot rolled steel sheet is aimed by specifying the matrix to be a substantially ferrite microstructure and finely dispersing carbides containing Ti and Mo into the ferrite microstructure. However, Mo has a function of interfering proceeding of austenite/ferrite transformation. Consequently, in the case where a hot rolled steel sheet is produced by using a steel in which Mo is an indispensable addition element, as in the technology proposed in Patent Literature 4, austenite/ferrite transformation does not proceed sufficiently in the end portion in the sheet width direction, where the cooling rate after coiling is large, and a low temperature transformation phase, e.g., bainite transformation, is formed. As a result, in some cases, the microstructure and the strength stable across the coil surface (across the sheet surface) are not obtained by the technology proposed in Patent Literature 4.

As described above, it is difficult for the technologies in the related art to obtain good in-plane strength uniformity of the high strength steel sheet having yield strength of 740 MPa or more.

Disclosed embodiments have been made in consideration of such circumstances, and it is an object to provide a high strength hot rolled steel sheet having yield strength of 740 MPa or more and exhibiting excellent in-plane strength uniformity and a method for manufacturing the same.

Solution to Problem

In order to solve the above-described issues, intensive studies were conducted on various factors which affect the strength and the strength uniformity of a hot rolled steel sheet.

As is generally known, a main factor behind the strength variations in the sheet width direction of a hot rolled steel sheet is a temperature decrease of the end portion in the width direction of the steel sheet (or steel) in each step of production of the hot rolled steel sheet. In particular, in the cooling step after completion of the hot rolling, the end portion in the sheet width direction of the steel sheet is supercooled, and this supercooling causes considerable temperature decrease of the end portion and, therefore, is an important factor behind the strength variations in the sheet width direction.

Then, studies were initially conducted on the technology to reduce influences exerted on strength variations by a temperature decrease of the end portion in the sheet width direction, which occurs in the cooling step after completion of the hot rolling.

As for the technique to improve the steel sheet strength, a technique to specify the parent phase microstructure of the hot rolled steel sheet to be a low temperature transformation phase, e.g., bainite or martensite, is considered. However, in order to produce a hot rolled steel sheet in which the parent phase microstructure of the hot rolled steel sheet is specified to be a low temperature transformation phase, it is necessary that the coiling temperature be set at lower than 600° C. Consequently, it is difficult to mitigate the influence exerted on strength variations by a temperature decrease of the end portion in the sheet width direction, which occurs in the cooling step after completion of the hot rolling. Meanwhile, in the case where the parent phase microstructure of the hot rolled steel sheet was specified to be a low temperature transformation phase, it was feared that the ductility and the like of the steel sheet were degraded and the workability was adversely affected. Then, it was noted that the technology aiming at enhancing the strength of the steel sheet by specifying the parent phase microstructure of the hot rolled steel sheet to be a ferrite single microstructure and finely dispersing carbides into the ferrite phase.

The ferrite phase is basically a mild metal microstructure and the strength of the steel sheet can be enhanced without causing degradation of the ductility and the like by precipitating fine carbides into the ferrite. Therefore, the strength of the steel sheet can be enhanced while the workability is maintained by specifying the parent phase microstructure of the hot rolled steel sheet to be a substantially ferrite single microstructure and finely precipitating carbides into the ferrite phase.

However, in such a case as well, it is still difficult to suppress strength variations caused by a temperature decrease of the end portion in the sheet width direction. This is because the amount of precipitation and the size (particle diameter) of fine carbides, which contribute to enhancement of the strength of the hot rolled steel sheet, depend on the cooling stop temperature in the cooling step after completion of the hot rolling, the coiling temperature, and the cooling rate after the coiling.

The hot rolled steel sheet having a microstructure in which carbides are precipitated in the ferrite phase is obtained usually by heating a steel to a γ region for the purpose of dissolving coarse carbides precipitated in the steel, performing hot rolling, and precipitating carbides along with γ→α transformation in the cooling step after completion of the hot rolling or the coiling step. Here, if γ→α transformation occurs in a high temperature range, that is, carbides are generated in a high temperature range, in the cooling step after completion of the hot rolling, the carbides are coarsened in the cooling and coiling step thereafter. Therefore, in the case where a steel in the related art is used as the element of the hot rolled steel sheet, from the viewpoint of making the carbides fine, it is preferable to optimize the production condition in such a way that γ→α transformation occurs in a low temperature range of about 620° C. or lower after completion of the hot rolling. On the other hand, in a low temperature range of, for example, about 560° C. or lower, carbides are not precipitated sufficiently because diffusion of an alloy element becomes difficult.

For the above-described reasons, in order to precipitate fine carbides, which contribute to enhancement of the strength of the steel sheet, sufficiently in the ferrite phase, it is preferable to control the cooling stop temperature and the coiling temperature in the cooling and coiling step after completion of the hot rolling to become within a predetermined temperature range (about 560° C. to 620° C.) in such a way that γ→α transformation occurs at the same time with the coiling.

However, there is a tendency of the temperature of the end portion in the sheet width direction to become lower than the temperature of the central portion in the sheet width direction because of secondary cooling effect due to side flow of cooling water in the cooling step after completion of the hot rolling and an effect of standing to cool in the coiling step onward. As a result, the amount of precipitation of carbides becomes insufficient in the end portion in the sheet width direction as compared with that in the central portion in the sheet width direction, and strength variations occur.

In consideration of such circumstances, studies were conducted on the technique to precipitate fine carbides sufficiently into the end portion in the sheet width direction as well and finely disperse carbides stably in the sheet width direction of the hot rolled steel sheet. As a result, it was found that optimization of the hot rolling condition and the chemical composition of the steel were effective.

Specifically, it was found that a temperature decrease of the end portion in the sheet width direction was able to be minimized by suppressing temperature variances in the sheet width direction of the steel sheet at the time of completion of the finish rolling in the hot rolling and changing the flow rate of cooling water of a run-out table from the flow rate in the related art.

Also, it was found that the thermal stability of fine carbides precipitated in the ferrite was able to be enhanced by optimizing the chemical composition of the steel and hard-to-coarsen fine carbides were obtained. Specifically, it was found that fine carbides, which were carbides containing Ti and which exhibited excellent thermal stability, were obtained by allowing the steel to contain predetermined amounts of C, Si, Mn, and Ti and contain no V or have a reduced V content. In accordance with this, it was made clear that even in the case where the cooling stop temperature and the coiling temperature of the central portion in the sheet width direction were set at somewhat high temperature in the cooling and coiling step after completion of the hot rolling, coarsening of fine carbides precipitated into the ferrite was able to be suppressed insofar as the above-described water cooling stop temperature and coiling temperature were within the range of 600° C. to 700° C.

Then, it was made clear that even in the case where a temperature decrease of the end portion in the sheet width direction occurred and cooling to a temperature range, in which precipitation of carbides was difficult, was caused, thermal conduction from the central portion to the end portion in the sheet width direction occurred, the temperature of the end portion in the sheet width direction increased after coiling into the shape of a coil and carbides were finely precipitated by setting the water cooling stop temperature and coiling temperature of the central portion in the sheet width direction at within the range of 600° C. to 700° C., as described above. That is, it was found that reduction in the strength of the coil end portion (end portion in the sheet width direction of the hot rolled steel sheet) was able to be suppressed by optimizing the chemical composition of the steel and the coiling temperature.

As described above, it was made clear that the hot rolled steel sheet having stable in-plane strength characteristics after coiling was obtained by optimizing the hot rolling condition and the chemical composition of the steel and, therefore, the compatibility between enhancement of strength and strength uniformity of the hot rolled steel sheet was able to be ensured.

Disclosed embodiments have been made on the basis of the above-described findings and the gist thereof is as described below.

[1] A high strength hot rolled steel sheet having a composition containing, on a percent by mass basis, C: 0.040% or more and 0.100% or less, Si: 0.50% or less, Mn: 1.00% or more and 2.00% or less, P: 0.03% or less, S: 0.006% or less, Al: 0.08% or less, N: 0.0080% or less, Ti: 0.14% or more and 0.22% or less, and the remainder composed of Fe and incidental impurities and a microstructure in which a primary phase is a ferrite phase and fine carbides containing Ti are dispersion-precipitated, wherein in each of the end portion and the central portion in the sheet width direction, the area ratio of the above-described ferrite phase is 95% or more, the average grain size of the above-described ferrite phase is 5.0 μm or less, the average particle diameter of the above-described fine carbides is 6 nm or less, and the amount of solid solution Ti is 0.03% or less on a percent by mass basis, the yield strength is 740 MPa or more, and a difference between the yield strength of the end portion in the sheet width direction and the yield strength of the central portion in the sheet width direction is 50 MPa or less.

[2] The high strength hot rolled steel sheet according to the item [1], wherein the above-described composition further contains, on a percent by mass basis, V: 0.001% or more and less than 0.07%.

[3] The high strength hot rolled steel sheet according to the item [1] or item [2], wherein the above-described composition further contains, on a percent by mass basis, 0.001% or more in total of at least one of Sn and Pb.

[4] The high strength hot rolled steel sheet according to any one of the items [1] to [3], wherein a coating layer is disposed on the steel sheet surface.

[5] The high strength hot rolled steel sheet according to the item [4], wherein the above-described coating layer is a galvanizing layer.

[6] The high strength hot rolled steel sheet according to the item [4], wherein the above-described coating layer is a hot-dip galvanizing layer or hot-dip galvannealing layer.

[7] A method for manufacturing a high strength hot rolled steel sheet, including the steps of heating a steel, performing hot rolling and water cooling, stopping the water cooling at a predetermined temperature, and performing coiling to produce a hot rolled steel sheet, wherein the above-described steel is specified to have a composition containing, on a percent by mass basis, C: 0.040% or more and 0.100% or less, Si: 0.50% or less, Mn: 1.00% or more and 2.00% or less, P: 0.03% or less, S: 0.006% or less, Al: 0.08% or less, N: 0.0080% or less, Ti: 0.14% or more and 0.22% or less, and the remainder composed of Fe and incidental impurities, the heating temperature of the above-described heating is specified to be 1,180° C. or higher and 1,350° C. or lower, the finish rolling completing temperature of the above-described hot rolling is specified to be 870° C. or higher, a temperature difference between a temperature at a position in the central portion in the sheet width direction and a temperature at a position in the end portion in the sheet width direction at the time of completion of the finish rolling is limited to 50° C. or less, the above-described water cooling is started within 3 s of completion of the finish rolling, the flow rate of cooling water is specified to be 1.05 $m^3/m^2$·min or more, an average cooling rate from the finish rolling completing temperature to the water cooling stop temperature is specified to be 20° C./s or more, and the above-described water cooling stop temperature and the coiling temperature of the above-described coiling are specified to be 600° C. or higher and 700° C. or lower.

[8] The method for manufacturing a high strength hot rolled steel sheet, according to the item [7], wherein the above-described composition further contains, on a percent by mass basis, V: 0.001% or more and less than 0.07%.

[9] The method for manufacturing a high strength hot rolled steel sheet, according to the item [7] or item [8], wherein the above-described composition further contains, on a percent by mass basis, 0.001% or more in total of at least one of Sn and Pb.

[10] The method for manufacturing a high strength hot rolled steel sheet, according to any one of the item [7] to [9], wherein a coating layer is formed on the above-described hot rolled steel sheet surface.

[11] The method for manufacturing a high strength hot rolled steel sheet, according to the item [10], wherein the above-described coating layer is a galvanizing layer.

[12] The method for manufacturing a high strength hot rolled steel sheet, according to the item [10], wherein the above-described coating layer is a hot-dip galvanizing layer or hot-dip galvannealing layer.

Advantageous Effects

According to disclosed embodiments, a high strength hot rolled steel sheet exhibiting excellent in-plane strength uniformity and having yield strength: 740 MPa or more is obtained. Therefore, according to embodiments, even in the case where the high strength hot rolled steel sheet is subjected to slitting and is used as a hoop, a hoop having insufficient strength and a hoop exhibiting degraded workability can be avoided. Consequently, according to embodiments, a high strength hot rolled steel sheet suitable for the uses of, for example, structural members for constructions and automobiles is obtained. Also, according to embodiments, a high strength hot rolled steel sheet exhibiting excellent strength and strength uniformity is obtained, as described above, and therefore, the uses of the high strength hot rolled steel sheet can be further developed. In this manner, the disclosed embodiments exert industrial effects considerably.

DETAILED DESCRIPTION

Disclosed embodiments will be specifically described below.

To begin with, reasons for the limitation of the chemical composition of the high strength hot rolled steel sheet according to embodiments will be described. In this regard, hereafter the term "%" representing the chemical composition refers to "percent by mass (mass %)" unless otherwise specified.

C: 0.040% or more and 0.100% or less

Carbon is bonded to Ti and V to form fine carbides and, therefore, is an element which contributes to enhancement of the strength of the hot rolled steel sheet. In order to obtain the hot rolled steel sheet having yield strength: 740 MPa or more, it is necessary to specify the C content to be 0.040% or more. In the case where further enhancement of the strength is aimed, for example, in order to obtain a hot rolled steel sheet having yield strength: 800 MPa or more, it is preferable that the C content be 0.060% or more. On the other hand, if the C content is more than 0.100%, the steel of disclosed embodiments is not made into a solid solution easily. As a result, in heating of the steel in production of the hot rolled steel sheet, coarse carbides (coarse carbides containing Ti) present in the steel before hot rolling cannot be dissolved and the amount of Ti finely precipitated in the hot rolled steel sheet after the hot rolling decreases, so that predetermined strength is not obtained. Therefore, the C content is specified to be 0.100% or less, and preferably 0.090% or less.

Si: 0.50% or less

Silicon is concentrated on the steel sheet surface easily to form fayalite ($Fe_2SiO_4$) on the steel sheet surface. This fayalite degrades the wettability and the chemical convertibility. In many cases, the high strength hot rolled steel sheet having yield strength: 740 MPa or more, which is the subject of this disclosure, is applied to parts having reduced thicknesses than ever and, therefore, the corrosion resistance is required because of the reduced thickness. Consequently, the high strength hot rolled steel sheet according to embodiments may be used after being subjected to a coating treatment or a chemical conversion treatment for the purpose of giving predetermined corrosion resistance, so that excellent wettability and chemical convertibility are also important. Then, in embodiments, the Si content is specified to be 0.50% or less for the purpose of ensuring the wettability and the chemical convertibility, and preferably 0.35% or less. In this regard, the Si content may be reduced to the impurity level.

Mn: 1.00% or more and 2.00% or less

Manganese has a function of lowering the austenite ($\gamma$)→ferrite ($\alpha$) transformation temperature ($Ar_3$ transformation point). As described above, along with lowering of austenite→ferrite transformation temperature, carbides precipitated into the ferrite are made fine, so that Mn is an element effective in enhancing the strength of the hot rolled steel sheet. In order to obtain such an effect, it is necessary to specify the Mn content to be 1.00% or more. On the other hand, if the Mn content is more than 2.00%, the above-described effect is saturated. Also, if the Mn content is more than 2.00%, in the cooling and coiling step after completion of the hot rolling in production of the hot rolled steel sheet, a low temperature transformation phase, e.g., bainite or martensite, is generated in the end portion in the sheet width direction, where the cooling rate is large, so that the in-plane strength uniformity is degraded. For the above-described reasons, the Mn content is specified to be 1.000 or more and 2.00% or less, and preferably 1.10% or more and 1.70% or less.

Here, Si and Mn are elements which change the $Ar_3$ transformation point of the steel. As described above, the $Ar_3$ transformation point is closely related to the precipitation form of fine carbides (in embodiments, fine carbides containing Ti) and the transformation behavior in the sheet width direction. Therefore, in order to improve the in-plane strength uniformity of the hot rolled steel sheet, it is desirable that the $Ar_3$ transformation point be adjusted by specifying the content of each of Si and Mn to satisfy Formula (1) described below.

$$3.0 \leq 5 \times [\% \text{ Mn}] - 14 \times [\% \text{ Si}] \leq 8.5 \qquad (1)$$

In Formula (1), [% Mn] represents a Mn content (percent by mass) and [% Si] represents a Si content (percent by mass). Also, in Formula (1), the coefficient of each of [% Mn] and [% Si] indicates the magnitude of influence exerted on a change in the $Ar_3$ transformation point by the content of element concerned.

The $Ar_3$ transformation point increases as the value of the middle side of Formula (1), that is, the value of 5×[% Mn]−14×[% Si] decreases. Then, if this value is less than 3.0, in the cooling step after completion of the hot rolling in production of the hot rolled steel sheet, austenite→ferrite transformation may be started in a high temperature range and, along with this, there is an increasing tendency of carbides to be precipitated and coarsened in the high temperature range. On the other hand, if the value of the middle side of Formula (1) is more than 8.5, proceeding of austenite→ferrite transformation may be excessively interfered in the cooling and coiling step after completion of the hot rolling in production of the hot rolled steel sheet. As a result, a low temperature transformation phase is formed in the end portion in the sheet width direction, where the cooling rate is large, and in some cases, a hot rolled steel sheet exhibiting good in-plane strength uniformity is not obtained. For the above-described reasons, the value of the middle side of Formula (1) is specified to be preferably 3.0 or more and 8.5 or less, and more preferably 3.3 or more and 5.5 or less.

In this regard, Formula (1) cannot be applied to a steel having a Nb content of more than 0.003%, a steel having a Mo content of more than 0.003%, and a steel having a B content of more than 0.0005%. Formula (1) is a formula derived for a steel in which the microstructure at the time of completion of the finish rolling is a recrystallized microstructure. This is because Nb is an element which interferes recrystallization of austenite and a recrystallized microstructure is not generated easily in the case of a steel having a Nb content of more than 0.003%. Also, this is because Mo and B are elements which interfere proceeding of austenite→ferrite transformation, although the influence thereof is not taken into consideration in Formula (1). From the viewpoint of them, it is preferable that Nb, Mo, and B be not contained in the steel according to embodiments and in the case where they are incidentally contained, the contents thereof are limited to preferably Nb: 0.003% or less, Mo: 0.003% or less, and B: 0.0005% or less. Limitation to Nb: 0.002% or less, Mo: 0.002% or less, and B: 0.0003% or less is more preferable.

P: 0.03% or less

Phosphorus is segregated at grain boundaries and causes intergranular cracking. Also, P is a harmful element which degrades the workability and the weldability of the steel. Then, it is preferable that the P content be minimized. In embodiments, in order to avoid the above-described problem, the P content is specified to be 0.03% or less, and preferably 0.02% or less. In this regard, the P content may be reduced to the impurity level.

S: 0.006% or less

Sulfur is present as inclusions, e.g., MnS and $Ti_4C_2S_2$, in the steel. In particular, in the case where $Ti_4C_2S_2$ is formed in the steel, the amount of precipitation of fine carbides (fine carbides containing Ti), which contribute to enhancement of the hot rolled steel sheet, is reduced. Consequently, S causes reduction in the strength and degradation in the strength uniformity. Therefore, in embodiments, the S content is preferably minimized. The S content is specified to be 0.006% or less, and preferably 0.003% or less. In this regard, the S content may be reduced to the impurity level.

Al: 0.08% or less

Aluminum forms an oxide and the like in the steel and serves as a starting point of a void in press forming of the hot rolled steel sheet. Consequently, if the Al content is too large, the workability (punchability) is degraded. Therefore, from the viewpoint of ensuring the workability of the hot rolled steel sheet, the Al content is specified to be 0.08% or less, and preferably 0.06% or less. However, Al has an effect as a deoxidizing element and, therefore, the content thereof is specified to be preferably 0.001% or more.

N: 0.0080% or less

Nitrogen is bonded to Ti and forms coarse TiN at the stage of steel making and continuous casting in production of the hot rolled steel sheet. The resulting coarse TiN does not contribute to enhancement of the strength of the hot rolled steel sheet. Consequently, N causes reduction in the strength and degradation in the strength uniformity. In order to obtain a hot rolled steel sheet having yield strength: 740 MPa or more, it is necessary that the N content be 0.0080% or less, and 0.0060% or less is preferable. In embodiments, it is desirable that the N content be minimized, and N is not necessarily contained.

Ti: 0.14% or more and 0.22% or less

Titanium is an element capable of considerably enhancing the strength of the hot rolled steel sheet by being brought into a solid solution state through heating of the steel to the γ range in production of the hot rolled steel sheet and being precipitated as fine carbides along with γ→α transformation in the cooling and coiling step after completion of the hot rolling. Meanwhile, Ti in the solid solution state before being precipitated as fine carbides has a function of suppressing generation of nucleus of the ferrite phase and has a function of suppressing an occurrence of γ→α transformation in a high temperature range in the cooling step after completion of the hot rolling. Therefore, Ti contributes to enhancement of the strength of the steel sheet substantially.

In order to obtain a hot rolled steel sheet having yield strength: 740 MPa or more, it is necessary that the Ti content be 0.140 or more. On the other hand, in the case where Ti is excessively added, coarse TiC cannot be dissolved at a heating stage of the steel in production of the hot rolled steel sheet. The coarse TiC serves as a stress-concentrated portion easily and degrades the toughness and the workability of the hot rolled steel sheet. In addition, if Ti is added excessively, finely precipitated carbides (fine carbides containing Ti) are coarsened easily after being precipitated. Consequently, the Ti content is specified to be 0.220 or less, and preferably 0.15% or more and 0.20% or less.

The basic composition of the high strength hot rolled steel sheet according to embodiments is as described above. However, in addition to the above-described basic composition, 0.001% or more in total of at least one of Sn and Pb may be further contained and is contained preferably from the viewpoint of the thermal stability of carbides.

As described later, one feature of disclosed embodiments is that the coiling temperature is set in somewhat high temperature range (600° C. or higher and 700° C. or lower) in which fine carbides (fine carbides containing Ti) precipitated in ferrite grains start particle growth in the related art. Therefore, in order to obtain a high strength hot rolled steel sheet having yield strength: 740 MPa or more, it is important to improve the thermal stability of fine carbides and suppress particle growth of fine carbides containing Ti in the above-described temperature range (600° C. or higher and 700° C. or lower).

As a result of studies conducted, it was found that inclusion of Sn and Pb was effective in improving the thermal stability of fine carbides containing Ti. Although the specific reasons for the above-described result are not certain, it is estimated that Sb and Pb have an effect of interfering diffusion of C and Ti which cause coarsening of carbides. In order to exert such an effect, it is preferable that 0.001% or more in total of at least one of Sn and Pb be contained, and more preferably 0.002% or more in total of at least one of Sn and Pb is contained. However, if more than 0.006% in total of at least one of Sn and Pb is contained, the above-described effect is saturated. Therefore, in the case where at least one of Sn and Pb is contained, the total content is limited to preferably 0.006% or less.

Also, in the high strength hot rolled steel sheet according to embodiments, the above-described composition may further contain the following elements.

V: 0.001% or more and less than 0.07%

Vanadium is an element which is bonded to C to be precipitated as fine carbides and which contributes to enhancement of the strength of the hot rolled steel sheet, as with Ti. In order to obtain such effects, the V content is specified to be preferably 0.001% or more, and more preferably 0.01% or more. However, the thermal stability of carbides containing V is inferior to the thermal stability of carbides not containing V, so that the strength uniformity of the hot rolled steel sheet may be adversely affected. In order to maintain the in-plane strength uniformity of the hot rolled steel sheet, the V content is specified to be preferably less than 0.07%, and more preferably 0.04% or less.

In this regard, from the viewpoint of improvement of the thermal stability of fine carbides containing Ti, it is preferable that C, Ti, V, Sn, and Pb be contained in such a way as to satisfy Formula (2) below.

$$1.42 \leq ([\% C]/12)/([\% Ti]/48+[\% V]/51)-5.2\times[\% V]+102\times([\% Sn]+[\% Pb]) \leq 2.92 \quad (2)$$

Here, in Formula (2), [% C], [% Ti], [% V], [% Sn], and [% Pb] represent contents (percent by mass) of C, Ti, V, Sn, and Pb, respectively. Meanwhile, in the case where the steel sheet does not contain V, [% V] in Formula (2) is specified to be zero and the value of middle side is calculated. The same goes for [% Sn] and [% Pb].

In the case where the C content is less than the total content of Ti and V, on an atomic ratio basis, the thermal stability of carbides is degraded and the first term of the middle side of Formula (2) indicates the magnitude of the influence thereof. Also, in the second and third terms of the middle side of Formula (2), the coefficient of each element content indicates the magnitude of the influence exerted on the thermal stability of carbides by the element content concerned. If the value of the middle side of Formula (2) is less than 1.42, the thermal stability of carbides is degraded easily. As a result, particle growth of fine carbides containing Ti occurs easily after the coiling in production of the hot rolled steel sheet, and reduction in the strength of the hot rolled steel sheet is feared. In particular, strength reduction of the central portion in the sheet width direction, where the cooling rate is small in the cooling step after completion of the hot rolling, tends to become larger than strength reduction of the end portion in the sheet width direction. On the other hand, an increase in the value of the middle side of Formula (2) does not adversely affect the characteristics of the hot rolled steel sheet, although the upper limit of the value of the middle side of Formula (2) of the steel according to embodiments is substantially 2.92.

Meanwhile, components other than those described above of the high strength hot rolled steel sheet according to embodiments are Fe and incidental impurities. As for incidental impurities, Nb, Mo, and B described above are mentioned. It is desirable that the contents of Nb, Mo, and B be Nb: 0.003% or less, Mo: 0.003% or less, and B: 0.0005% or less, as described above. Examples of other incidental impurities include O (oxygen), Se, Te, Po, As, Bi, Ge, Ga, In, Ti, Zn, Cd, Hg, Ag, Au, Pd, Pt, Co, Rh, Ir, Ru, Os, Tc, Re, Ta, Be, Sr, REM, Ni, Cr, Sb, Cu, and Mg. The upper limit of allowable content of each of these elements is 0.01%.

Next, reasons for the limitation of the microstructure of the high strength hot rolled steel sheet according to disclosed embodiments will be described.

In embodiments, strengthening by fine carbides precipitated at the same time with the austenite→ferrite transformation is intended. Therefore, in embodiments, the microstructure of the high strength hot rolled steel sheet is specified to be a microstructure in which a primary phase is a ferrite phase and fine carbides containing Ti are dispersion-precipitated.

Here, the fine carbides containing Ti refer to those having a composition containing Ti and C among precipitates dispersed in ferrite grains, and the precipitates may contain N, V, and the like. In this regard, in the case where the steel sheet composition is a composition containing V in embodiments, V is not precipitated on the basis of vanadium alone and is precipitated as a compound carbide of Ti and V.

Also, the disclosed embodiments aim at making the strength of the hot rolled steel sheet uniform across the sheet surface, in particular, in the entire region in the sheet width direction, besides aiming at enhancement of the hot rolled steel sheet. In order to make the strength of the hot rolled steel sheet uniform in the entire region in the sheet width direction, it is preferable that the microstructure of the hot rolled steel sheet be made uniform in the entire region in the sheet width direction. Therefore, in embodiments, the microstructure of the end portion in the sheet width direction and the microstructure of the central portion in the sheet width direction of the hot rolled steel sheet are specified to be the same. Specifically, in both the end portion and the central portion in the sheet width direction of the microstructure, the area ratios of the above-described ferrite phases are specified to be 95% or more, the average grain sizes of the above-described ferrite phases in the sheet width direction are specified to be 5.0 μm or less, the average particle diameters of the above-described fine carbides (fine carbides containing Ti) are specified to be 6 nm or less, and the amounts of solid solution Ti are specified to be 0.03% or less on a percent by mass basis.

Here, in embodiments, the end portion in the sheet width direction refers to the portion between the position 10 mm from the end edge and the position 90 mm from the end edge in the sheet width direction. The portion at the position less than 10 mm from the end edge of the sheet width is excluded from the end portion in the sheet width direction because the measurement of the steel sheet temperature and the evaluation with a tensile test piece cannot be performed appropriately in the portion at the position less than 10 mm from the end edge of the sheet width. In this regard, the sheet width of the high strength hot rolled steel sheet which is the subject of disclosed embodiments is usually about 0.9 to 1.6 m.

As described above, the microstructure of the end portion in the sheet width direction and the microstructure of the central portion in the sheet width direction are specified because in the case where the microstructures of the two are the same, it can be assumed that the microstructure of the hot rolled steel sheet is uniform in the entire region in the sheet width direction (end portion in the sheet width direction and the region on the side nearer to the center in the sheet width direction than is the end portion in the sheet width direction). That is, in the case where in both the end portion and the central portion in the sheet width direction, the area ratios of the above-described ferrite phases are 95% or more, the average grain sizes of the above-described ferrite phases are 5.0 μm or less, the average particle diameters of the above-described fine carbides are 6 nm or less, and the amounts of solid solution Ti are 0.03% or less on a percent by mass basis, it can be assumed that in the entire region in the sheet width direction, the area ratio of the above-described ferrite phase is 95% or more, the average grain size of the above-described ferrite phase is 5.0 im or less, the average particle diameter of the above-described fine carbides is 6 nm or less, and the amount of solid solution Ti is 0.03% or less on a percent by mass basis.

The reasons for the limitation of the area ratios of the ferrite phases, the average grain sizes of the ferrite phases, the average particle diameters of the fine carbides, and the amounts of solid solution Ti of the end portion and the central portion in the sheet width direction to the above-described numerical value ranges are as described below.

Area ratio of ferrite phase: 95% or more

If metal microstructures, e.g., the bainite phase and the martensite phase, other than the ferrite phase are formed, the in-plane strength uniformity is degraded significantly and, in addition, predetermined strength of the hot rolled steel sheet is not obtained in some cases. From such a viewpoint, it is desirable that the parent phase microstructure of the hot rolled steel sheet be substantially only a ferrite phase. In the case where the area ratio of the ferrite phase is 95% or more, a hot rolled steel sheet exhibiting sufficient strength and strength uniformity in combination is obtained. Therefore, the area ratio of the ferrite phase is specified to be 95% or more, preferably 98% or more, and more preferably 100%.

In this regard, the microstructure of the high strength hot rolled steel sheet according to embodiments may include cementite, pearlite, and bainite besides the ferrite phase. In the case where cementite, pearlite, and bainite are included, the area ratio of them is specified to be preferably 5% or less in total, and is specified to be more preferably 3% or less in total.

Average grain size of ferrite phase: 5.0 μm or less

The average grain size of the ferrite phase has an influence on mainly hardening by grain refinement. Therefore, in order to ensure good in-plane strength uniformity while ensuring the predetermined strength of the hot rolled steel sheet, it is necessary that the microstructure of the hot rolled steel sheet exhibit in-plane uniformity. As for the steel according to embodiments, in the case where the average grain size of the ferrite phase is 5.0 μm or less, a mixed grain microstructure is not formed and a stable amount of grain refinement hardening can be obtained. For the above-described reasons, the average grain size of the ferrite phase is specified to be 5.0 μm or less, and preferably 4.0 μm or less. In this regard, a lower limit of the average grain size of the ferrite phase is not particularly specified, although a lower limit of the average grain size substantially obtained in disclosed embodiments is about 1.0 μm.

Average particle diameter of fine carbides containing Ti: 6 nm or less

In embodiments, enhancement of strength of the hot rolled steel sheet is achieved by fine carbides containing Ti. In order to specify the yield strength of the hot rolled steel sheet to be 740 MPa or more, it is necessary that the average particle diameter of fine carbides containing Ti be 6 nm or less, and preferably 4 nm or less. In this regard, a lower limit of this average particle diameter is not particularly specified, although a lower limit of the average particle diameter substantially obtained in embodiments is about 0.8 nm.

Amount of solid solution Ti: 0.03% or less on a percent by mass basis

The amount of precipitates dispersion hardening obtained by dispersing fine carbides depends on not only the size of carbide but also the amount of precipitation thereof. In the case where the amount of Ti not precipitated, that is, the amount of solid solution Ti, among Ti contained in the hot rolled steel sheet is 0.03% or less on a percent by mass basis, predetermined strength of the hot rolled steel sheet (yield strength: 740 MPa or more) is obtained. Therefore, the amount of solid solution Ti is specified to be 0.03% or less on a percent by mass basis, and preferably 0.015% or less. The amount of solid solution Ti is most preferably 0% (in the state in which the total amount of Ti added is precipitated as carbides).

As described above, a hot rolled steel sheet exhibiting high strength and, in addition, excellent strength uniformity, specifically a high strength hot rolled steel sheet having yield strength of 740 MPa or more, where a difference between the yield strength of the end portion in the sheet width direction and the yield strength of the central portion in the sheet width direction is 50 MPa or less, is obtained by specifying the composition and the microstructure.

A coating layer may be formed on the surface of the hot rolled steel sheet according to embodiments. The type of coating layer does not much matter and any one of electroplated coating layer and electroless coating layer can be applied. Also, an alloy component of the coating layer does not much matter. Examples of preferable coating layers include galvanizing layers, in particular hot-dip galvanizing layers and hot-dip galvannealing layers, although not limited to them, as a matter of course. The corrosion resistance of the hot rolled steel sheet is improved by forming the coating layer on the surface and, for example, application to parts, which are used in particularly severe corrosive environments, among automotive parts become possible.

Next, the method for manufacturing a high strength hot rolled steel sheet, according to embodiments, will be described.

For example, the hot rolled steel sheet according to embodiments can be produced by a method in which a steel having the above-described composition is heated, hot rolling and water cooling are performed, the water cooling is stopped at a predetermined temperature, and coiling is performed. In this manufacturing method according to embodiments, the heating temperature of the above-described heating is specified to be 1,180° C. or higher and 1,350° C. or lower, the finish rolling completing temperature of the above-described hot rolling is specified to be 870° C. or higher, a temperature difference between a temperature at a position in the central portion in the sheet width direction and a temperature at a position in the end portion in the sheet width direction at the time of completion of the finish rolling is limited to 50° C. or less, the above-described water cooling is started within 3 s of completion of the finish rolling, the flow rate of cooling water is specified to be 1.05 $m^3/m^2 \cdot min$ or more, an average cooling rate from the finish rolling completing temperature to the water cooling stop temperature is specified to be 20° C./s or more, and the above-described water cooling stop temperature and the coiling temperature of the above-described coiling are specified to be 600° C. or higher and 700° C. or lower.

In disclosed embodiments, the method for melt-refining the steel is not specifically limited, and a known melt-refining method, e.g., a converter or an electric furnace, can be adopted. Also, secondary smelting may be performed with a vacuum degassing furnace. Thereafter, it is preferable that a slab (steel) be prepared by a continuous casting method from the viewpoints of productivity and the quality. However, the slab (steel) may be prepared by a known casting method, e.g., an ingot making-roughing method or a thin slab continuous casting method.

Heating temperature of steel: 1,180° C. or higher and 1,350° C. or lower

The steel obtained as described above is subjected to hot rolling. In disclosed embodiments, it is necessary that the steel be heated to a substantially homogeneous austenitic single phase prior to the hot rolling and coarse carbides (carbides containing Ti) be dissolved. If the heating temperature of the steel is lower than 1,180° C., coarse carbides are not dissolved, so that the amount of carbides finely dispersed in the cooling and coiling step after completion of the hot rolling is reduced and the strength of the finally obtained hot rolled steel sheet is reduced significantly. On the other hand, if the above-described heating temperature is higher than 1,350° C., scale biting occurs and the steel sheet surface quality is degraded.

For the above-described reasons, the heating temperature of the steel is specified to be 1,180° C. or higher and 1,350° C. or lower, and preferably 1,200° C. or higher and 1,320° C. or lower. However, when the steel is subjected to the hot rolling, in the case where the steel after casting is in the temperature range of 1,180° C. or higher and 1,350° C. or lower, or carbides in the steel are dissolved, the steel may be directly rolled without being heated.

After the steel is heated to the above-described heating temperature, hot rolling is performed. The hot rolling is usually composed of rough rolling and finish rolling. The rough rolling condition is not specifically limited. Meanwhile, in the case where a slab (steel) is cast by, for example, a thin slab continuous casting method, rough rolling may be omitted. The finish rolling is performed under the condition described below.

Finish rolling completing temperature: 870° C. or higher

In embodiments, the finish rolling completing temperature measured on the steel sheet surface in the central portion in the sheet width direction on the finish rolling delivery side is specified to be 870° C. or higher. As described later, the temperature difference between the temperature of the central portion in the sheet width direction and the temperature of the end portion in the sheet width direction at the time of completion of the finish rolling of 50° C. at the maximum is allowed. Consequently, if the finish rolling completing temperature measured on the steel sheet surface in the central portion in the sheet width direction is lower than 870° C., the rolling temperature of the end portion in the sheet width direction, where the temperature decreases easily, may become lower than 820° C. If steel according to embodiments is rolled at a temperature lower than 820° C., rolling force increases significantly, and production of the hot rolled steel sheet becomes difficult or impossible. In addition, if the rolling temperature of the end portion in the sheet width direction is lower than 820° C., the ductility and the in-plane strength uniformity of the hot rolled steel sheet are degraded significantly because of two-phase region rolling. Therefore, it is necessary that the finish rolling completing temperature measured on the steel sheet surface in the central portion in the sheet width direction on the finish rolling delivery side be 870° C. or higher, and preferably 880° C. or higher and 1,000° C. or lower.

Temperature difference between temperature of central portion in sheet width direction and temperature of end portion in sheet width direction at the time of completion of finish rolling: 50° C. or less In order to establish good in-plane strength uniformity of the hot rolled steel sheet, it is necessary that the microstructure of the end portion in the sheet width direction and the microstructure of the central portion in the sheet width direction of the hot rolled steel sheet coiled into the shape of a coil be specified to be the same. In order to obtain the same steel sheet microstructure, as described above, it is effective to reduce a temperature decrease of the end portion in the sheet width direction between completion of the finish rolling and the coiling step. Then, in embodiments, a temperature difference between a temperature at a position in the central portion in the sheet width direction and a temperature at the position in the end portion in the sheet width direction at the time of completion of the finish rolling is limited to 50° C. or less. In the case where this temperature difference is 50° C. or less, degradation in the in-plane strength uniformity resulting from steel sheet temperature distribution before water cooling can be suppressed. Preferably, this temperature difference is minimized and, therefore, a lower limit is not particularly specified.

In order to limit the above-described temperature difference to 50° C. or less by reducing temperature variations in the sheet width direction at the time of completion of the finish rolling, for example, local heating of the steel sheet end portion before the finish rolling is effective. Also, in the case where rough rolling is performed, it is also effective to raise the rough rolling delivery temperature. In this regard, a radiation thermometer (spot measurement) installed in a production line is usually used for the temperature measurement of the hot rolled steel sheet at the time of completion of the finish rolling. Here, in the measurement of the temperature at a position in the end portion in the sheet width direction at the time of completion of the finish rolling, preferably, an influence of measurement variations is reduced by specifying the measurement center point to be the position 40 to 60 mm from the end edge in the sheet width direction of the hot rolled steel sheet. The spot diameter in the spot measurement by using the radiation thermometer is usually 20 to 40 mmϕ. Therefore, in the case where the temperature at the end edge in the sheet width direction and the vicinity thereof is specified to be the measurement center point, a region in which the steel sheet is not present may be included in the measurement spot and a measurement error increases.

Elapsed time from completion of finish rolling to start of water cooling: within 3 s In the steel sheet under a high temperature state just after the finish rolling, strain energy accumulated in the austenite phase is large, so that carbides are generated due to strain-induced precipitation. The resulting carbides are precipitated at high temperatures and, therefore, are coarsened easily, so that it is difficult to obtain fine precipitates. Consequently, precipitation of carbides due to strain-induced precipitation causes reduction in the strength and the in-plane strength uniformity of the hot rolled steel sheet. Therefore, in embodiments, it is necessary that forced cooling be started promptly after completion of the hot rolling for the purpose of suppressing strain-induced precipitation, and water cooling is started within 3 seconds of completion of the finish rolling at the maximum, and preferably within 2 seconds. The elapsed time until the cooling is started depends on the production condition and the configuration of a hot rolling mill, that is, the distance from a finish rolling machine to a water cooling apparatus, and is substantially 0.2 seconds or more.

Flow rate of cooling water in water cooling: 1.05 m$^3$/m$^2$·min or more

It was newly found that control of the flow rate of cooling water in the water cooling with a run-out table was effective in specifying the microstructure of the end portion in the sheet width direction and the microstructure of the central portion in the sheet width direction of the hot rolled steel sheet coiled into the shape of a coil to be the same and improving the in-plane strength uniformity. In order to specify the microstructure of the end portion in the sheet width direction and the microstructure of the central portion in the sheet width direction of the hot rolled steel sheet coiled into the shape of a coil to be the same, it is necessary that the flow rate of the cooling water in the forced cooling be specified to be 1.05 m$^3$/m$^2$·min or more, preferably 1.25 m$^3$/m$^2$·min or more and 2.25 m$^3$/m$^2$·min or less.

In this regard, the above-described flow rate is a flow rate of the cooling water injected from a spray nozzle of the cooling apparatus to the steel sheet surface. Also, the flow rate of the cooling water (flow rate of the cooling water injected from a spray nozzle of the cooling apparatus to the steel sheet surface) is specified to be uniform in the entire range in the sheet width direction of the steel sheet.

Average cooling rate from finish rolling completing temperature to water cooling stop temperature: 20° C./s or more As described above, coarsening of carbides due to strain-induced precipitation proceeds easily as the period of time in which the steel sheet after completion of the finish rolling is held at high temperatures increases. Meanwhile, if the cooling rate is small, ferrite transformation is started at high temperatures and carbides are coarsened easily. Consequently, quenching is necessary after completion of the finish rolling, and in order to avoid the above-described problems, water cooling at an average cooling rate of 20° C./s or more is necessary, and 40° C./s or more is preferable. However, if the cooling rate after completion of the finish rolling is too large, it may become difficult to control the coiling temperature and it may become difficult to obtain stable strength. Therefore, the above-described average cooling rate is specified to be preferably 150° C./s or less. In this regard, the value of the above-described average cooling rate is a value measured on the steel sheet surface in the central portion in the sheet width direction.

Water cooling stop temperature and coiling temperature: 600° C. or higher and 700° C. or lower In embodiments, a temperature decrease of the end portion in the sheet width direction, which is a problem in the water cooling and the coiling, is suppressed as much as possible by suppressing temperature variations in the sheet width direction at the time of completion of the finish rolling and controlling the flow rate of the cooling water. However, even in the case where such measures are taken, it is difficult to completely solve the temperature decrease problem of the end portion in the sheet width direction, so that fine carbides are not sufficiently precipitated and the strength is reduced in the end portion in the sheet width direction.

Then, in embodiments, the above-described problem is solved by setting the coiling temperature in somewhat high temperature range in which carbides may be coarsened in the steel of the related art. In the case where the coiling temperature is set in somewhat high temperature range, as described above, even when the temperature of the end portion in the sheet width direction decreases to a temperature range in which fine carbides are not precipitated easily in the coiling, the end portion temperature increases to a temperature range in which fine carbides are precipitated easily by thermal conduction from the central portion in the sheet width direction to the end portion in the sheet width direction after the coiling. Therefore, after coiling into the shape of a coil, a sufficient amount of precipitation can be ensured by facilitating precipitation of fine carbides in the end portion in the sheet width direction of the hot rolled steel sheet.

In order to obtain the above-described effects, it is necessary that the water cooling stop temperature and the coiling temperature be specified to be 600° C. or higher. On the other hand, if the water cooling stop temperature and the coiling temperature are higher than 700° C., the carbide coarsening problem becomes apparent, and the strength and the in-plane strength uniformity of the hot rolled steel sheet are reduced. Consequently, the water cooling stop temperature and the coiling temperature are specified to be 700° C. or lower, and preferably 620° C. or higher and 680° C. or lower. Here, the values of the above-described water cooling stop temperature and coiling temperature are values of the temperatures measured on the steel sheet surface in the central portion in the sheet width direction.

On the other hand, in the central portion in the sheet width direction of the hot rolled steel sheet, fine carbides are precipitated in the coiling, so that fine carbides are precipitated in a somewhat high temperature range, in which carbides may be coarsened in the steel of the related art.

However, in embodiments, the thermal stability of carbides is improved by adjusting the composition of the steel, so that a phenomenon of coarsening of fine carbides precipitated in the central portion in the sheet width direction of the steel sheet can be suppressed and the amount of reduction in the strength resulting from coarsening of fine carbides can be reduced considerably. Therefore, according to the disclosed embodiments, the amount of precipitation of fine carbides can be ensured in the end portion in the sheet width direction of the steel sheet and, in addition, coarsening of fine carbides can be suppressed in the central portion in the sheet width direction of the steel sheet. As a result, the high strength hot rolled steel sheet exhibiting excellent strength uniformity can be obtained, where predetermined strength (yield strength: 740 MPa or more) is exhibited in the entire region in the sheet width direction and, in addition, variations in the yield strength in the sheet width direction are 50 MPa or less.

In this regard, in order to facilitate thermal conduction from the central portion in the sheet width direction to the end portion in the sheet width direction while a temperature decrease of the end portion in the sheet width direction of the hot rolled steel sheet is suppressed, it is also effective to suppress a temperature decrease due to a temperature gradient between the air and the coil by attaching a cover to the coil after the coiling.

The characteristics of the hot rolled steel sheet after the coiling do not change regardless of the state in which scale adheres to the surface or the state in which scale has been removed by performing pickling, and the above-described excellent characteristics are exhibited in both states. Also, in embodiments, a coating layer may be formed on the hot rolled steel sheet surface by subjecting the hot rolled steel sheet after the coiling to a coating treatment.

The type of coating layer does not much matter and any one of electroplated coating layer and electroless coating layer can be applied. Also, an alloy component of the coating layer does not much matter. Examples of preferable coating layers include galvanizing layers, in particular hot-dip galvanizing layers and hot-dip galvannealing layers, although not limited to them, as a matter of course. The method of coating treatment does not much matter. Examples include a method in which the hot rolled steel sheet is passed through a continuous coating line and the steel sheet is dipped into a coating bath and is pulled up. Also, after the coating treatment, an alloying treatment may be performed by heating the steel sheet surface in a furnace, e.g., a gas furnace. In this regard, even when the hot rolled steel sheet according to embodiments is subjected to the coating treatment and the alloying treatment, the above-described effects of the disclosed embodiments are not impaired.

EXAMPLES

A steel having the composition shown in Table 1 and a thickness: 220 to 260 mm was made into a hot rolled steel sheet (hot rolled coil) having a sheet thickness of 1.2 to 4.0 mm and a sheet width of 1.2 m under the condition shown in Table 2. Also, part of the resulting hot rolled steel sheets were passed through a hot-dip galvanizing line at an annealing temperature of 720° C. and were dipped into a coating bath (coating composition: Zn-0.13 mass % Al) at 460° C., so that hot dip galvanized sheets (GI sheets) were produced. Also, part of steel sheets were passed through the hot-dip galvanizing line and were dipped into the coating bath, as described above, and thereafter, an alloying treatment was performed at 520° C., so that hot-dip galvannealed sheets (GA sheets) were produced. The amount of deposition of coating of each of the GI sheet and the GA sheet was specified to be 45 to 60 g/m$^2$ on a surface basis.

The average cooling rate described in Table 2 is an average cooling rate from the finish rolling completing temperature to the water cooling stop temperature. Also, the finish rolling completing temperature, the water cooling stop temperature, and the coiling temperature described in Table 2 are temperatures measured by using a radiation thermometer (measurement spot diameter: 40 mm$\phi$, measurement distance: 1.6 m) installed in the line, where the temperature measurement position was specified to be the central portion in the sheet width direction of the steel sheet.

As for the steel sheets other than Steel sheet No. 3 shown in Table 2, a temperature difference between a temperature at a position in the central portion in the sheet width direction and a temperature at a position in the end portion in the sheet width direction at the time of completion of the finish rolling was adjusted to a predetermined value by using an edge heater attached at a position before a finish rolling machine of a hot rolling line.

In this regard, in the measurement of the temperature at a position in the end portion in the sheet width direction at the time of completion of the finish rolling, a radiation thermometer (measurement spot diameter: 40 mm$\phi$, measurement distance: 1.6 m) installed in the line was used, where the measurement center point was specified to be the position 50 mm from the end edge in the sheet width direction.

Samples, that is, 22 samples in total, were taken from each of the hot rolled coils (hot rolled steel sheet, GI sheet, and GA sheet) obtained as described above. Specifically, 11 positions in the longitudinal direction (positions dividing the coil into ten equal parts in the longitudinal direction and front and rear end portions in the coil longitudinal direction) of the resulting hot rolled coil were specified, and samples were taken from the end portion in the sheet width direction and the central portion in the sheet width direction of each position in the longitudinal direction, so that 22 samples in total (samples of the end portions in the sheet width direction: 11 and samples of the central portions in the sheet width direction: 11) were taken. The resulting samples were used and the microstructure observation, the extraction residue analysis, and the tensile test were performed.

(1) Microstructure Observation

The resulting samples were used and the area ratio of the ferrite phase, the average grain size of the ferrite phase, and the average particle diameter of fine carbides containing Ti were determined. In this regard, among the samples used for determining them, the samples of the end portions in the sheet width direction were taken at the positions 25 mm from the end edges in the sheet width direction.

The area ratio and the average grain size of the ferrite phase were evaluated by the following techniques. As for the sheet thickness central portion of a cross-section parallel to a rolling direction of each sample, a microstructure exposed by etching with 5% nital was photographed with a scanning optical microscope in 10 fields of view at the magnification of 1,000 times. The ferrite phase is a microstructure having a form in which a corrosion speck and cementite are not observed in a grain. Also, the area ratio and the grain size were determined on the assumption that polygonal ferrite, bainitic ferrite, acicular ferrite, and granular ferrite are ferrite.

The area ratio of the ferrite phase was determined on the basis of the area ratio of the ferrite phase relative to the observation field of view, where the ferrite phase was separated from bainite, martensite, and the like, which were those other than the ferrite phase, by image analysis. At this time, grain boundaries observed as a linear form was earmarked for part of the ferrite phase.

The average grain size of the ferrite phase was determined by a linear intercept method in conformity with ASTM E 112-10, where 10 horizontal lines and 10 vertical lines were drawn with respect to each of three typical photographs among the above-described photographs taken at the magnification of 1,000 times. Finally, the average value of the values obtained on the basis of the three photographs was specified to be the average grain size.

The average particle diameter of carbides (carbides containing Ti) in crystal grain of the ferrite phase was determined by producing a thin film sample from the sheet thickness central portion of each sample by a thin film method, observing the resulting thin film sample with a transmission electron microscope (magnification: 135,000 times) in a dark field, measuring particle diameters (equivalent circle diameters) of 100 or more carbides containing Ti among observed carbides, and calculating the average value of them. An EDX (Energy Dispersive X-ray microanalyzer) attached to the transmission electron microscope was used for identification of the carbide, and it was ascertained that Ti was contained in the carbide. In this regard, in calculation of this average particle diameter, it was assumed that coarse cementite and nitrides having a particle diameter of 1.0 μm or more were not contained.

(2) Extraction Residue Analysis

The taken sample was used and the amount of solid solution Ti was determined on the basis of extraction residue analysis. In this regard, among the samples used for determination of the amount of solid solution Ti, the samples of the end portions in the sheet width direction were taken at the positions 25 mm from the end edges in the sheet width direction.

About 0.2 g of each sample was subjected to constant current electrolysis at a current density of 20 mA/cm$^2$ in a 10% AA based electrolytic solution (10-vol % acetylacetone-1-mass % tetramethylammonium chloride-methanol) and, thereafter, precipitates (including carbides containing Ti, cementite, and oxides) contained in the electrolytic solution were separated, and the amount of Ti contained in the electrolytic solution was quantified with an ICP emission spectrometric apparatus. The amount of solid solution Ti (weight ratio) was determined from the weight of electrolyzed sample and the amount of Ti contained in the electrolytic solution.

The results obtained as described above are shown in Table 3. In this regard, in Table 3, the column "End portion in sheet width direction of hot rolled steel sheet" indicates the average value of 11 samples taken from the end portions in the sheet width direction and the column "Central portion in sheet width direction of hot rolled steel sheet" indicates the average value of 11 samples taken from the central portions in the sheet width direction.

(3) Tensile Test

The tensile test was performed by using the taken samples, the yield strength (YS), the tensile strength (TS), and the total elongation (El) were determined, and the strength and the strength uniformity were evaluated. In this regard, among the samples (tensile test pieces having a width of parallel portion of 30 mm) used for performing the tensile test, the samples of the end portions in the sheet width direction were taken as portions between the position 10 mm from the end edge and the position 40 mm from the end edge in the sheet width direction. Also, among the samples used for performing the tensile test, the samples of the central portions in the sheet width direction were taken as portions between the positions ±15 mm from the central point in the sheet width direction.

A JIS No. 13B tensile test piece (sample) was produced, where the tensile direction was parallel to the rolling direction (L direction). A tensile test was performed in conformity with the specification of JIS Z 2241 (2011) and the yield strength (YS), the tensile strength (TS), and the total elongation (El) were determined. The yield strength was specified to be lower yield stress point or 0.2% proof stress. Then, the case where the yield strength (YS) was 740 MPa or more was evaluated as good strength.

A value (ΔYS) was determined by subtracting the yield strength of the sample of the end portion in the sheet width direction from the yield strength of the sample of the central portion in the sheet width direction. The case where the absolute value of the resulting value (ΔYS) was 50 MPa or less was evaluated as good in-plane strength uniformity.

In this regard, in the present example, a standard deviation (σ) of the yield strength of all samples (22 in total) was also determined.

The results of the tensile test are shown in Table 4. In this regard, in Table 4, the column "End portion in sheet width direction of hot rolled steel sheet" indicates the average value of 11 samples taken from the end portions in the sheet width direction and the column "Central portion in sheet width direction of hot rolled steel sheet" indicates the average value of 11 samples taken from the central portions in the sheet width direction. Also, in Table 4, the ΔYS is a value determined by subtracting the yield strength of the sample of the end portion in the sheet width direction from the yield strength of the sample of the central portion in the sheet width direction, and the σ is a standard deviation of the yield strength of all samples (22 in total).

In Table 4, in the case where all the yield strength: 740 MPa or more, the above-described ΔYS: 50 MPa or less in an absolute value, and the above-described σ: 25 MPa or less were satisfied, it was considered that the mechanical properties required in the disclosed embodiments were provided and the evaluation was good "◯". On the other hand, any one of the yield strength: 740 MPa or more, the above-described ΔYS: 50 MPa or less in an absolute value, and the above-described σ: 25 MPa or less was not satisfied, it was considered that the mechanical properties required in disclosed embodiments were not satisfied and the evaluation was poor "x".

TABLE 1

| Steel | Chemical composition (mass %) | | | | | | | | | | Middle side of Formula (1) | Middle side of Formula (2) | Remarks |
| | C | Si | Mn | P | S | Al | N | Ti | V | Sn + Pb | | | |
|---|---|---|---|---|---|---|---|---|---|---|---|---|---|
| A | 0.055 | 0.06 | 1.23 | 0.02 | 0.001 | 0.03 | 0.0053 | 0.15 | — | — | 5.3 | 1.47 | Embodiment steel |
| B | 0.075 | 0.21 | 1.34 | 0.02 | 0.003 | 0.03 | 0.0049 | 0.19 | — | — | 3.8 | 1.58 | Embodiment steel |
| C | 0.081 | 0.35 | 1.65 | 0.01 | 0.002 | 0.02 | 0.0052 | 0.17 | — | — | 3.4 | 1.91 | Embodiment steel |
| D | 0.055 | 0.32 | 1.64 | 0.01 | 0.002 | 0.04 | 0.0044 | 0.16 | — | 0.002 | 3.7 | 1.58 | Embodiment steel |

TABLE 1-continued

| Steel | Chemical composition (mass %) | | | | | | | | | | Middle side of Formula (1) | Middle side of Formula (2) | Remarks |
|---|---|---|---|---|---|---|---|---|---|---|---|---|---|
| | C | Si | Mn | P | S | Al | N | Ti | V | Sn + Pb | | | |
| E | 0.075 | 0.21 | 1.35 | 0.01 | 0.001 | 0.04 | 0.0047 | 0.16 | 0.03 | — | 3.8 | 1.44 | Embodiment steel |
| F | 0.085 | 0.25 | 1.38 | 0.01 | 0.001 | 0.03 | 0.0053 | 0.19 | 0.04 | 0.002 | 3.4 | 1.49 | Embodiment steel |
| G | 0.076 | 0.15 | 1.28 | 0.01 | 0.001 | 0.04 | 0.0041 | 0.16 | 0.04 | 0.005 | 4.3 | 1.84 | Embodiment steel |
| H | 0.022 | 0.26 | 1.61 | 0.01 | 0.002 | 0.02 | 0.0050 | 0.15 | — | — | 4.4 | 0.59 | Comparative steel |
| I | 0.065 | 0.27 | 0.52 | 0.02 | 0.001 | 0.02 | 0.0042 | 0.17 | — | — | −1.2 | 1.53 | Comparative steel |
| J | 0.083 | 0.26 | 1.47 | 0.01 | 0.001 | 0.06 | 0.0052 | 0.08 | — | — | 3.7 | 4.15 | Comparative steel |
| K | 0.065 | 0.20 | 1.63 | 0.01 | 0.001 | 0.04 | 0.0052 | 0.25 | — | — | 5.4 | 1.04 | Comparative steel |

Formula (1): $3.0 \leq 5 \times [\% Mn] - 14 \times [\% Si] \leq 8.5$ ([% Mn] and [% Si] represent contents (mass %) of Mn and Si)
Formula (2): $1.42 \leq ([\% C]/12)/([\% Ti]/48 + [\% V]/51) - 5.2 \times [\% V] + 102 \times ([\% Sn] + [\% Pb]) \leq 2.92$ ([% C], [% Ti], [% V], [% Sn], and [% Pb] represent contents (mass %) of C, Ti, V, Sn, and Pb)

TABLE 2

| | | Hot rolling condition | | | | | | | | | |
|---|---|---|---|---|---|---|---|---|---|---|---|
| | | | Finish rolling | | | | | | | | |
| Steel sheet No. | Steel | Steel heating temperature (° C.) | Completion temperature (° C.) | Temperature difference between end portion and central portion (° C.)*1 | Water cooling start time (s) | Flow rate of cooling water (m³/m²·min) | Average cooling rate (° C./s) | Water cooling stop temperature (° C.) | Coiling temperature (° C.) | Coil length (m) | Remarks |
| 1 | A | 1230 | 890 | 38 | 1.6 | 1.47 | 33 | 642 | 630 | 810 | Example |
| 2 | | 1240 | 910 | 33 | 1.7 | 1.78 | 48 | 685 | 680 | 1204 | Example |
| 3 | | 1250 | 900 | 72 | 1.3 | 1.15 | 30 | 629 | 620 | 1118 | Comparative example |
| 4 | | 1250 | 910 | 43 | 1.6 | 0.65 | 27 | 655 | 640 | 649 | Comparative example |
| 5 | | 1230 | 870 | 39 | 1.3 | 1.29 | 28 | 579 | 570 | 843 | Comparative example |
| 6 | | 1240 | 910 | 42 | 1.1 | 1.65 | 59 | 761 | 750 | 494 | Comparative example |
| 7 | B | 1230 | 880 | 32 | 0.8 | 1.32 | 34 | 680 | 670 | 674 | Example |
| 8 | C | 1220 | 890 | 30 | 1.3 | 1.21 | 43 | 657 | 650 | 731 | Example |
| 9 | D | 1240 | 890 | 34 | 1.4 | 1.44 | 44 | 659 | 650 | 576 | Example |
| 10 | E | 1250 | 900 | 35 | 1.2 | 1.28 | 50 | 655 | 640 | 624 | Example |
| 11 | F | 1240 | 900 | 21 | 1.6 | 1.58 | 55 | 675 | 670 | 482 | Example |
| 12 | G | 1250 | 890 | 25 | 1.5 | 1.26 | 40 | 652 | 638 | 526 | Example |
| 13 | H | 1240 | 880 | 44 | 1.6 | 1.40 | 42 | 637 | 630 | 624 | Comparative example |
| 14 | I | 1250 | 920 | 37 | 1.5 | 1.36 | 52 | 648 | 640 | 800 | Comparative example |
| 15 | J | 1250 | 920 | 30 | 1.2 | 1.21 | 40 | 677 | 670 | 680 | Comparative example |
| 16 | K | 1230 | 910 | 29 | 1.6 | 1.88 | 35 | 688 | 680 | 770 | Comparative example |

*1 Temperature difference in hot rolled steel sheet on finish rolling delivery side: (temperature of central portion in sheet width direction of steel sheet) − (temperature at a position in end portion in sheet width direction of steel sheet)

TABLE 3

| | | Microstructure of hot rolled steel sheet | | | | | | | | | |
|---|---|---|---|---|---|---|---|---|---|---|---|
| | | End portion in sheet width direction of hot rolled steel sheet | | | | | Central portion in sheet width direction of hot rolled steel sheet | | | | |
| Steel sheet No. | Steel | Area ratio of ferrite phase (%) | Type of microstructure other than ferrite phase*2 | Average grain size of ferrite phase (μm) | Average particle diameter of carbides containing Ti (nm) | Amount of solid solution Ti (mass %) | Area ratio of ferrite phase (%) | Type of microstructure other than ferrite phase*2 | Average grain size of ferrite phase (μm) | Average particle diameter of carbides containing Ti (nm) | Amount of solid solution Ti (mass %) | Remarks |
| 1 | A | 99 | P | 2.7 | 2 | 0.01 | 100 | — | 3.0 | 2 | <0.01 | Example |
| 2 | | 100 | — | 3.3 | 2 | <0.01 | 100 | — | 3.5 | 3 | <0.01 | Example |

TABLE 3-continued

| | | Microstructure of hot rolled steel sheet | | | | | | | | | |
|---|---|---|---|---|---|---|---|---|---|---|---|
| | | End portion in sheet width direction of hot rolled steel sheet | | | | | Central portion in sheet width direction of hot rolled steel sheet | | | | |
| Steel sheet No. | Steel | Area ratio of ferrite phase (%) | Type of micro-structure other than ferrite phase*2 | Average grain size of ferrite phase (μm) | Average particle diameter of carbides containing Ti (nm) | Amount of solid solution Ti (mass %) | Area ratio of ferrite phase (%) | Type of micro-structure other than ferrite phase*2 | Average grain size of ferrite phase (μm) | Average particle diameter of carbides containing Ti (nm) | Amount of solid solution Ti (mass %) | Remarks |
| 3 | | 99 | P | 1.5 | 2 | 0.04 | 99 | P | 3.5 | 2 | 0.01 | Comparative example |
| 4 | | 96 | P | 2.2 | 3 | 0.05 | 100 | — | 3.2 | 3 | <0.01 | Comparative example |
| 5 | | 93 | B | 2.4 | 2 | 0.04 | 98 | B | 2.9 | 3 | 0.02 | Comparative example |
| 6 | | 100 | — | 6.5 | 10 | <0.01 | 100 | — | 8.6 | 12 | <0.01 | Comparative example |
| 7 | B | 100 | — | 3.2 | 3 | 0.01 | 100 | — | 3.3 | 3 | 0.01 | Example |
| 8 | C | 99 | P | 2.8 | 2 | <0.01 | 99 | P | 3.2 | 3 | <0.01 | Example |
| 9 | D | 100 | — | 2.6 | 3 | <0.01 | 100 | — | 2.9 | 3 | <0.01 | Example |
| 10 | E | 99 | P | 2.7 | 2 | <0.01 | 99 | P | 2.8 | 2 | <0.01 | Example |
| 11 | F | 98 | P | 2.2 | 2 | 0.01 | 98 | P | 2.5 | 2 | <0.01 | Example |
| 12 | G | 98 | P | 2.5 | 2 | <0.01 | 99 | P | 2.2 | 2 | <0.01 | Example |
| 13 | H | 100 | — | 7.6 | 16 | 0.07 | 100 | — | 9.1 | 21 | 0.08 | Comparative example |
| 14 | I | 100 | — | 8.3 | 11 | <0.01 | 100 | — | 8.6 | 12 | <0.01 | Comparative example |
| 15 | J | 96 | P | 4.5 | 3 | <0.01 | 97 | P | 5.5 | 3 | <0.01 | Comparative example |
| 16 | K | 100 | — | 3.7 | 8 | 0.04 | 100 | — | 4.5 | 11 | 0.03 | Comparative example |

*2P: Pearlite, B: Bainite

TABLE 4

| | | | Result of tensile test | | | | | | | | | |
|---|---|---|---|---|---|---|---|---|---|---|---|---|
| | | | End portion in sheet width direction of hot rolled steel sheet | | | Central portion in sheet width direction of hot rolled steel sheet | | | Strength stability | | | |
| Steel sheet No. | Steel | Coating *3 | Yield strength YS (MPa) | Tensile strength TS (MPa) | Total elongation EL (%) | Yield strength YS (MPa) | Tensile strength TS (MPa) | Total elongation EL (%) | ΔYS (MPa) | σ (MPa) | Evaluation*4 | Remarks |
| 1 | A | — | 751 | 816 | 19 | 771 | 820 | 19 | 20 | 18 | ○ | Example |
| | | GI | 748 | 817 | 19 | 760 | 817 | 19 | 12 | 12 | ○ | Example |
| | | GA | 752 | 814 | 19 | 769 | 827 | 19 | 17 | 16 | ○ | Example |
| 2 | | — | 763 | 812 | 19 | 749 | 797 | 20 | −14 | 7 | ○ | Example |
| 3 | | — | 694 | 754 | 18 | 754 | 802 | 19 | 60 | 31 | x | Comparative example |
| 4 | | — | 702 | 755 | 19 | 759 | 825 | 19 | 57 | 28 | x | Comparative example |
| 5 | | — | 692 | 736 | 18 | 762 | 811 | 19 | 70 | 49 | x | Comparative example |
| 6 | | — | 703 | 764 | 21 | 658 | 700 | 23 | −45 | 39 | x | Comparative example |
| 7 | B | — | 876 | 932 | 19 | 849 | 913 | 19 | −27 | 6 | ○ | Example |
| 8 | C | — | 840 | 894 | 19 | 836 | 909 | 19 | −4 | 10 | ○ | Example |
| | | GI | 845 | 899 | 19 | 840 | 894 | 19 | −5 | 8 | ○ | Example |
| | | GA | 844 | 908 | 19 | 845 | 909 | 18 | 1 | 16 | ○ | Example |
| 9 | D | — | 819 | 881 | 19 | 828 | 890 | 19 | 9 | 12 | ○ | Example |
| 10 | E | — | 887 | 944 | 19 | 863 | 918 | 19 | −24 | 19 | ○ | Example |
| 11 | F | — | 945 | 1027 | 18 | 936 | 1006 | 18 | −9 | 15 | ○ | Example |
| | | GI | 940 | 1011 | 18 | 941 | 1001 | 18 | 1 | 10 | ○ | Example |
| | | GA | 940 | 1022 | 18 | 935 | 1005 | 18 | 5 | 16 | ○ | Example |
| 12 | G | — | 941 | 1018 | 18 | 946 | 1021 | 18 | 5 | 12 | ○ | Example |
| 13 | H | — | 486 | 523 | 25 | 419 | 455 | 25 | −67 | 45 | x | Comparative example |
| 14 | I | — | 504 | 525 | 20 | 482 | 524 | 20 | −22 | 32 | x | Comparative example |
| 15 | J | — | 635 | 690 | 21 | 648 | 697 | 21 | 13 | 25 | x | Comparative example |

TABLE 4-continued

| | | | Result of tensile test | | | | | | Strength stability | | | |
|---|---|---|---|---|---|---|---|---|---|---|---|---|
| | | | End portion in sheet width direction of hot rolled steel sheet | | | Central portion in sheet width direction of hot rolled steel sheet | | | | | | |
| Steel sheet No. | Steel | Coating *3 | Yield strength YS (MPa) | Tensile strength TS (MPa) | Total elongation EL (%) | Yield strength YS (MPa) | Tensile strength TS (MPa) | Total elongation EL (%) | ΔYS (MPa) | σ (MPa) | Evaluation*4 | Remarks |
| 16 | K | — | 735 | 817 | 20 | 695 | 788 | 20 | −40 | 36 | x | Comparative example |

*3 "—" represents hot rolled steel sheet with no coating, "GI" represents hot rolled steel sheet with hot-dip galvanizing layer, and "GA" represents hot rolled steel sheet with hot-dip galvannealing layer
*4 case where all YS: 740 MPa or more, ΔYS: 50 MPa or less in absolute value, and σ: 25 MPa or less are satisfied is good "○" and case where any one of YS: 740 MPa or more, ΔYS: 50 Mpa or less in absolute value, and σ: 25 MPa or less is not satisfied is poor "x"

All examples of disclosed embodiments are hot rolled steel sheets having yield strength: 740 MPa or more and exhibiting excellent in-plane strength uniformity. On the other hand, as for Comparative examples which are out of the scope of disclosed embodiments, predetermined high strength is not obtained or good strength uniformity is not obtained.

The invention claimed is:

1. A hot rolled steel sheet having a composition comprising:
C: 0.040% to 0.100%, by mass %;
Si: 0.50% or less, by mass %;
Mn: 1.00% to 2.00%, by mass %;
P: 0.03% or less, by mass %;
S: 0.006% or less, by mass %;
Al: 0.08% or less, by mass %;
N: 0.0080% or less, by mass %;
Ti: 0.14% to 0.22%, by mass %; and
Fe and incidental impurities,
wherein the hot rolled steel sheet includes a microstructure in which a primary phase is a ferrite phase and carbides containing Ti are dispersion-precipitated,
in each of an end portion and a central portion of the steel sheet in the sheet width direction, the area ratio of the ferrite phase is in the range of 95% or more, the average grain size of the ferrite phase is in the range of 5.0 μm or less, the average particle diameter of the carbides is in the range of 6 nm or less, and the amount of solid solution Ti is in the range of 0.03% or less, by mass %, and
the steel sheet has a yield strength in the range of 740 MPa or more and a difference between the yield strength of the end portion in the sheet width direction and the yield strength of the central portion in the sheet width direction is in the range of 50 MPa or less.

2. The hot rolled steel sheet according to claim 1, wherein the composition further comprises V: 0.001% to less than 0.07%, by mass %.

3. The hot rolled steel sheet according to claim 1, wherein the composition further comprises 0.001% or more, by mass %, in total of at least one of Sn and Pb.

4. The hot rolled steel sheet according to claim 1, wherein a coating layer is disposed on the steel sheet surface.

5. The hot rolled steel sheet according to claim 4, wherein the coating layer is a galvanizing layer.

6. The high strength hot rolled steel sheet according to claim 4, wherein the coating layer is a hot-dip galvanizing layer or a hot-dip galvannealing layer.

7. A method for manufacturing a hot rolled steel sheet having a composition comprising C; 0.040% to 0.100%, by mass %, Si: 0.50% or less, by mass %, Mn; 1.00% to 2.00%, by mass %, P; 0.03% or less, by mass %, S; 0.006% or less, by mass %, Al: 0.08% or less, by mass %, N: 0.0080% or less, by mass %, Ti: 0.14% to 0.22%, by mass %, and Fe and incidental impurities, the method comprising:
heating a steel precursor;
performing hot rolling and water cooling on the steel precursor; stopping the water cooling at a predetermined temperature; and performing coiling to produce a hot rolled steel sheet,
wherein the heating temperature of the heating is in the range of 1180° C. to 1350° C.,
a finish rolling completing temperature of the hot roiling is in the range of 870° C. or higher and a temperature difference between a temperature at a position in a central portion of the steel sheet in the sheet width direction and a temperature at a position in the end portion of the steel sheet in the sheet width direction at the time of completion of the finish roving is in the range of 50° C. or less,
the water cooling is started within 3 s of completion of the finish rolling, the flow rate of cooling water is in the range of 1.05 m³/m² min or more, and an average cooling rate from the finish rolling completing temperature of the hot rolling to the water cooling stop temperature is in the range of 20° C./s or more, and
the water cooling stop temperature and a coiling temperature of the coiling are in the range of 600° C. to 700° C., thereby producing the hot rolled steel sheet according to claim 1.

8. The method for manufacturing a hot rolled steel sheet according to claim 7, wherein the composition further comprises V: 0.001% to less than 0.07%, by mass %.

9. The method for manufacturing a hot rolled steel sheet according to claim 7, wherein the composition further comprises 0.001% or more, by mass %, in total of at least one of Sn and Pb.

10. The method for manufacturing a hot rolled steel sheet according to claim 7, wherein a coating layer is formed on the hot rolled steel sheet surface.

11. The method for manufacturing a hot rolled steel sheet according to claim 10, wherein the coating layer is a galvanizing layer.

12. The method for manufacturing a hot rolled steel sheet according to claim 10, wherein the coating layer is a hot-dip galvanizing layer or a hot-dip galvannealing layer.

13. The hot rolled steel sheet according to claim 2, wherein the composition further comprises 0.001% or more, by mass %, in total of at least one of Sn and Pb.

14. The method for manufacturing a hot rolled steel sheet, according to claim 8, wherein the composition further comprises 0.001% or more, by mass %, in total of at least one of Sn and Pb.

15. The hot rolled steel sheet according to claim 1, wherein the difference between the yield strength of the end portion in the sheet width direction and the yield strength of the central portion in the sheet width direction is in a range of 1 MPa or more and 50 MPa or less.

* * * * *